United States Patent [19]
Simonian et al.

[11] Patent Number: 5,971,375
[45] Date of Patent: *Oct. 26, 1999

[54] ISOLATOR APPARATUS FOR MULTI-DIMENSIONAL VIBRATIONAL DISTURBANCES

[75] Inventors: Stepan S. Simonian, Torrance; Ramzi A. Ghaby, Redondo Beach, both of Calif.

[73] Assignee: TRW Inc., Redondo Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,469

[22] Filed: Nov. 26, 1996

[51] Int. Cl.$^6$ ........................................... F16M 1/00
[52] U.S. Cl. .............................................. 267/136
[58] Field of Search ................................. 188/378, 379, 188/780; 207/136; 248/562, 676; 244/158 R

[56] References Cited

U.S. PATENT DOCUMENTS

| | | | |
|---|---|---|---|
| 5,052,529 | 10/1991 | Sutcliffe et al. | 188/380 X |
| 5,433,422 | 7/1995 | Ross et al. | 188/379 X |
| 5,558,191 | 9/1996 | Lai | 267/136 X |
| 5,687,958 | 11/1997 | Renz et al. | 267/136 |

OTHER PUBLICATIONS

Applications of Robust Damping Treatments to Advanced Spacecraft Structures by T.W. Nye, A.J. Bronowicki, R.A. Manning and S.S. Simonian, vol. 92 Advances in the Astronautical Sciences, Guidance and Control 1996, an American Astronautical Society Publication, pp. 531–543, Proceedings of the Annual Rocky Mountain Guidance and Control Conference held Feb. 7–11, 1996, Beckenridge, Colorado.

*Primary Examiner*—Robert J. Oberleitner
*Assistant Examiner*—Mariand Sy
*Attorney, Agent, or Firm*—Michael S. Yatsko

[57] ABSTRACT

There is provided an apparatus (10) for isolating an operating device against multi-dimensional disturbances which includes a series of spring assemblies (12) that are affixed between a support platform (14) and an operating device (16). The series of spring assemblies are affixed to a support platform (14) and mounted in three paired units to provide global isolation of the operating device against forces that act in five directions. Each spring assembly is equipped with a first and second set of spring elements (20) and (22) which absorb disturbance forces acting in an axial direction. The spring element (22) is a damping unit (30) which dampens the lateral vibrational forces caused by dynamic imbalance of the vibration-generating source. Included with each spring assembly is a load diverter (50) which serves to insulate the operating device against the sudden high vibrational forces that might be incurred during the launch of a satellite during the first minutes of the launch. The apparatus is described in connection with exploratory telescopes in space but provide advantages for insulating any operating device against multi-dimensional vibrational forces.

18 Claims, 4 Drawing Sheets

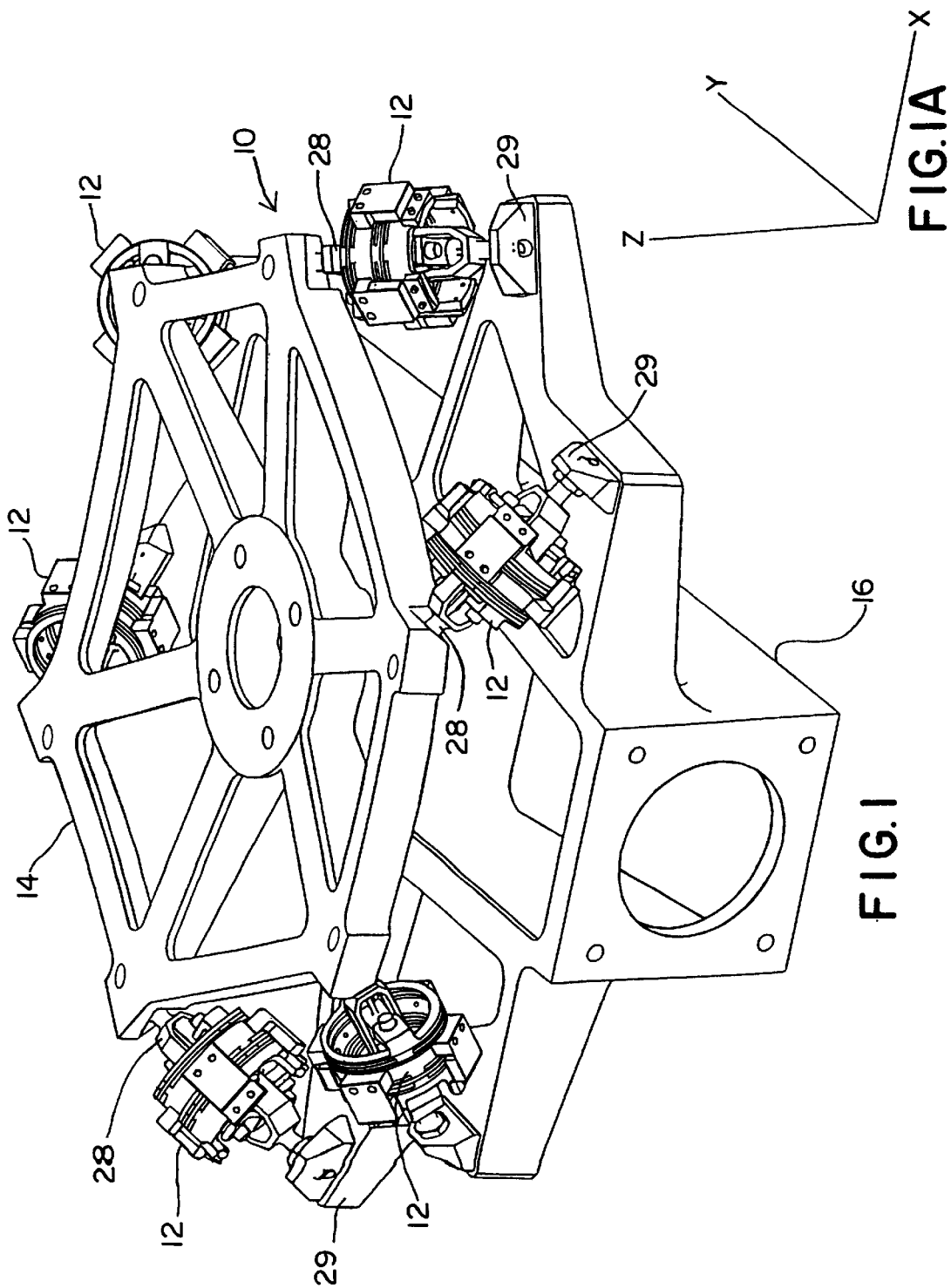

ISOLATOR APPARATUS FOR MULTI-DIMENSIONAL VIBRATIONAL DISTURBANCES

The United States Government may have license rights to this invention provided for by the terms of a Government Contract.

BACKGROUND

1. Field of Invention

This invention relates generally to apparatus for isolating an operating device against multi-dimensional vibration disturbances and, more particularly, to an apparatus for isolating sensitive instrumentalities on-board a space vehicle against on-board generated vibrational disturbances.

2. Discussion

It is becoming increasingly important in exploratory-type space missions to ensure the optimum performance of various instrumentalities aboard a space vehicle while operating in its orbital path and also at the time of launch. The reliability of performance of such instrumentalities as space telescopes may be interfered with due to the vibrational disturbances generated during the launching process as well as in flight by the on-board equipment, such as the attitude stabilizing reaction wheels. For example, in space vehicles whose mission it is to carry out telescopic surveillance, it is essential to maintain the mirrors focused on targets in space. Reaction wheels are known to generate vibrational frequencies over a range of 5 Hz to 100 Hz and greater, which could disturb the precise pointing of the telescope. Another example involves telescopic surveillance of x-ray radiation, which requires control of the vibration disturbances, otherwise the required x-ray images would be distorted and enlarged.

Protection of the sensitive instruments and devices on the spacecraft against the high G-forces and vibration during launch is accomplished by securing or releasably locking them in place during launch. Once the spacecraft is in orbit, the locked down instruments are deployed by being unlocked using pyrotechnic devices that ordinarily generate very high localized frequency vibrations.

It is generally known to use techniques for isolating vibration sensitive equipment against the adverse effects of vibration-generating disturbances. Such apparatus typically involves the use of elastomeric or rubber-like mountings which are interposed between the vibration-generating source and the affected operating equipment thereby absorbing the vibration thereby minimizing the transmissibility of the vibrational sources. The success of such basic rubber pads or cushions depends on the kinds of vibrational forces being generated. Effective isolation apparatus requires that it control the known kinds of multi-dimensional disturbances that result from rotating equipment such as, for example, the static imbalance, axial run-out as well as the moments generated due to dynamic imbalances that are applied in a lateral direction.

Rotating equipment generally will generate disturbances in five directions. When considered in the environment of an XYZ coordinate system, rotating equipment produces lateral forces in each of the X and Y direction, axial forces are in the Z direction, and the force moments due to dynamic imbalance are produced about the lateral X and Y axis.

The isolator devices of this invention can be employed to advantage in other apparatus where the functional requirement is the precise acquisition and maintenance of a target. For example, in a step and repeat lithographic process, the control of vibrational disturbances is essential. Wherever high-intensity pinpoint laser beams are employed to operate against a fixed objective, it is desirable to isolate the generated beam from any high frequency vibration and force moments. There is a need for isolator apparatus that can effectively, simultaneously respond to the diverse kinds of vibrational disturbances and moments, and thereby minimize the line of sight jitter interference with pointing, imaging and maintaining stability within the range of 0.4 $\mu$rad to 0.64 $\mu$rad.

SUMMARY

There is provided an apparatus for isolating an operating device against multi-dimensional disturbances caused by vibrational forces generated in an axial and lateral direction. The apparatus includes a series of spring assemblies disposed between the vibrational generating forces and the operating device. Each spring assembly further comprises first and second spring elements operating along an activating axis means, said activating axis means including an axial load diverter means which is adapted to respond to the directional vibration forces and restraint of sudden or steady-state axial loads applied to the operating device. There is provided support means for attaching a series of spring assemblies between the operating device and the vibration-generating means whereby the axially generated vibrational forces are absorbed in the spring elements. The lateral vibrational forces are dampened by said load diverter means, thereby isolating the operating device from the vibrational forces.

A further advancement is the second spring assembly in which a flexure member is in parallel with a spanning viscoelastic shear-resistant pad that restricts the axial flexure of the second spring means.

The invention disposes the series of six spring assemblies in three paired sets affixed to a support member with their activating axes intersecting the plane which contains a center of mass of the combined isolator and operating device.

From the subsequent detailed description taken in conjunction with the accompanying drawings and subjoined claims, other objects and advantages of the present invention will become apparent to those skilled in the art.

DRAWINGS

FIG. 1 is a perspective of a series of isolator springs mounted between an operating device and the support for the vibration-generating equipment;

FIG. 1a represents the coordinate system which defines the directional path for the multi-dimensional forces experienced by the operating device of FIG. 1;

DETAILED DESCRIPTION OF THE PREFERRED EMBODIMENTS

Figure 2A:
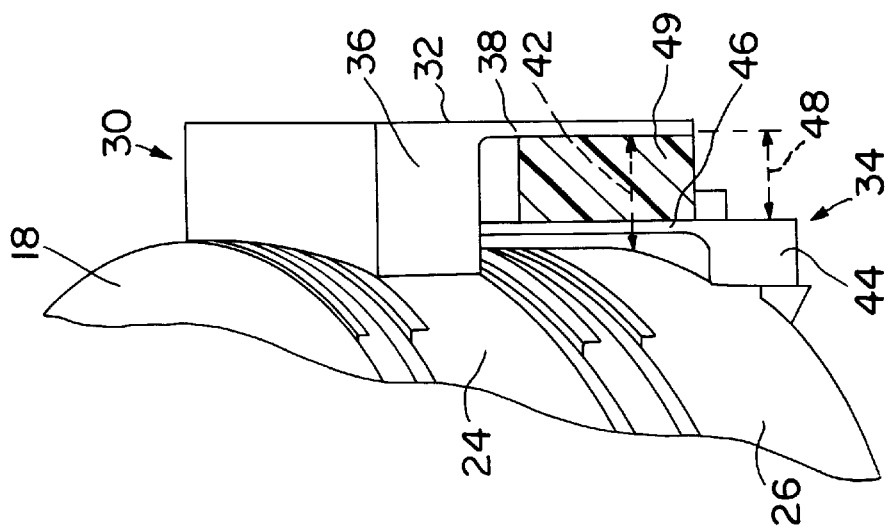
FIG. 2a is an enlarged detail of the damping unit which is in parallel with a set of flexures.

Referring to FIG. 1, the apparatus for isolating an operating device against multi-dimensional vibrational disturbances is shown and identified by the general reference numeral 10. The apparatus 10 includes a series of spring assemblies 12 that are affixed between a support platform 14 and a operating device 16. The operating device which is to be isolated will be referred to in this description as an x-ray telescope (not depicted) used in space exploration. It will be understood that the advantages of this invention are applicable to any operating device whose function it is to maintain a precise position such as a high-intensity laser beam or a step and repeat photographic system in an environment where vibrational disturbances could defeat its function. While the invention is particularly suitable for space vehicles, it is equally advantageous for use with terrestrial applications.

The platform 14 in the instant invention is adapted to receive the well-known reaction wheel (not shown) which stabilizes the attitude of the space vehicle in its orbital path in space. The reaction wheel rotates at speeds in the range of 5 rpm to 4,000 rpm. Typically, the rotation of the wheel generates multi-dimensional vibrational forces which need to be isolated from the operating device 16.

A better understanding of the invention may be had from a description of the kinds of disturbances generated by a rotating or spinning piece of apparatus which are controlled by the unique structure of the spring assemblies 12. Using the rotating action wheel (not shown) as an example, it generates several different kinds of disturbances caused by the inherent mechanical irregularities within the spinning device structure. Since we are dealing with a rotating wheel, its center of mass may be offset and this will produce a static imbalance. The device spinning about an axis of rotation may generate a dynamic imbalance due to misalignment of the spin axis. Typically, there are bearing mounts for the wheel shaft and this produces axial run-out which causes a reciprocating axial motion causing vibrations. The apparatus includes a series of three pairs of spring assemblies 12 that are affixed to the support platform 14 and operating device 16 by anchors 28 and 29. In the reaction wheel case there are five directional disturbances that must be controlled.

Referring to FIG. 1a, there is shown a system of coordinates, defining the paths along which the five directional disturbances proceed. The lateral forces proceed along the X and Y axis. The axial run-out will generate disturbances in the Z direction. The force moments imposed on the apparatus by the dynamic imbalance will be generated about each of the lateral X and Y direction.

Figure 2:
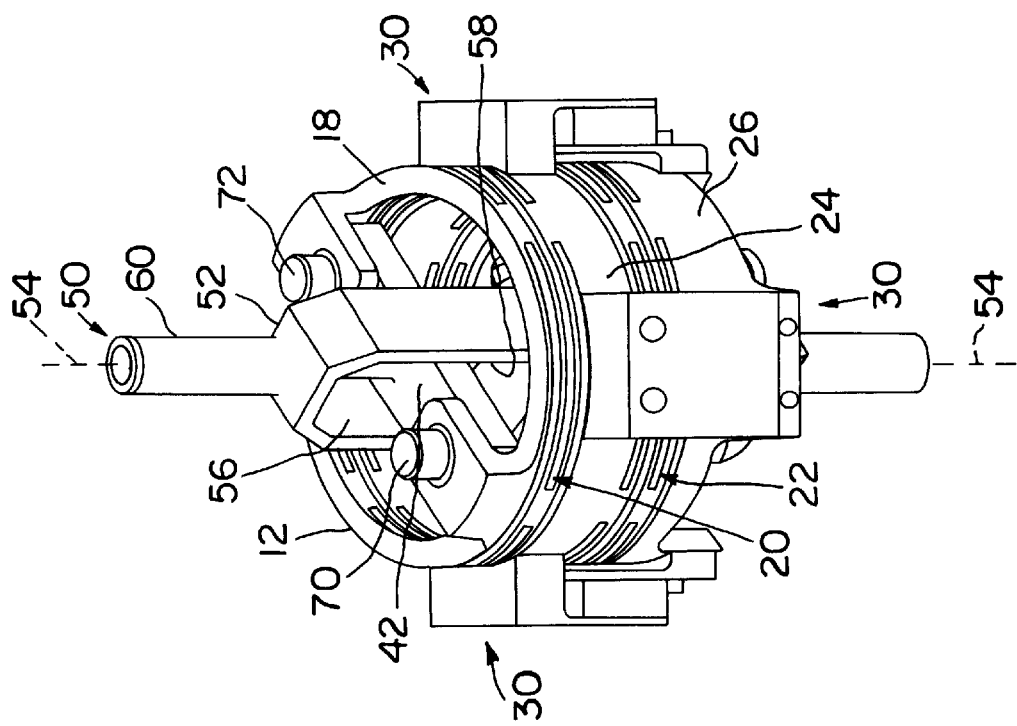
FIG. 2 is a perspective view of a spring assembly.

Referring to FIGS. 2 and 2a, the spring assembly 12 is formed from a cylindrical shell 18 made of titanium, portions of which are machined to form a first and second set of flexures 20 and 22. The vibrational disturbances generated by the reaction wheel mounted on the platform 14 are transmitted to each of the spring assemblies 12 through the anchors 28, each spring assembly operating to protect the device 16 thereby protecting the device, such as an x-ray telescope, against dislocation. The machine flexures 20 and 22 are spaced apart leaving contiguous the intervening wall portions of the shell 24 and 26. With this construction the first and second flexures 20 and 22 will respond independently to any applied vibrational forces while functioning in a series relationship with one another. By way of example, the operating range of the machined flexure thickness for the purpose of this invention is 0.025" to 0.035", the preferred thickness being 0.032". It will be appreciated that the thickness of the flexures as well as the number of such flexures and generally the size of the shell 18 in terms of its diameter and length may be varied to meet the particular isolation requirements of the application.

As the system is exposed to multi-dimensional disturbances, the flexures 20 and 22 will respond to the axial loads absorbing the energy concurrently. As the disturbances reach a resonant frequency the insulator needs to dampen the amplitude of axial motion of the flexures in order to control amplification of the springs at these resonant frequencies. Bridging the flexure 22, there is provided a series of axially-directed damping units identified by the general reference numeral 30.

The damping units 30 are positioned at 90° intervals about the perimeter of the shell 18. Each damping unit 30 is constructed of a pair of opposing, spaced-apart, L-shaped upper and lower brackets 32 and 34, respectively. The foot 36 of the upper L-shaped bracket 32 is affixed to the wall section 24 of the shell 18 and the leg 38 extends downward reaching the vicinity of the wall section 26, and in a direction that is parallel to the wall sections 24 and 26. The downward extending leg 38 forms a gap 42 between the wall sections 24 and 26. The size of the gap from the wall is equal to the length of the foot 36. The lower L-shaped bracket 34 is similarly constructed with a foot 44 and a leg 46. The foot extends partway into the space 42 and the leg 46 extends parallel to and upward along the wall section 24 and 26. The length dimension of the foot 44 is smaller than its counterpart 36, thereby forming a slot 48 between the legs 38 and 46 within the gap 42. Within the slot 48 there is secured a viscoelastic shear member 49 and of thickness 48 whose properties are such that it increases in stiffness when exposed to high vibrational frequencies and becomes less stiff at lower frequencies. It also responds to cold temperatures increasing in stiffness and becoming much less stiff under warm or hot temperature conditions.

The construction of the damping unit 30 in parallel with and straddling the lower flexure 22 will respond to resonant frequencies by becoming very stiff and exerting a damping force on the action of the flexure 22. In essence, the damping units 30 restrain the flexures 22 against the resonant condition which is experienced by the isolator 10 thereby controlling the force moments generated about each of the X and Y axes shown in FIG. 1a. There are four damping units 30 affixed about the perimeter of each spring assembly 12 at 90° intervals. The viscoelastic pad 49 is about 0.25" square and 0.16" thick. It is secured in the slot 48 between the inside surfaces of the legs 38 and 46 by means of a conventional adhesive. The viscoelastic material may be any high damping material, the preferred material is ISD 113 material available from 3M company. With the damping action of the units 30 together with flexures 20 and 22 the system is desensitized against wide variations in stiffness of the viscoelastic material 49 brought about by temperature changes. Thus, this particular arrangement of 20, 22 and 49, insures that the isolator resonant frequencies are kept in a narrow range.

Figure 4:
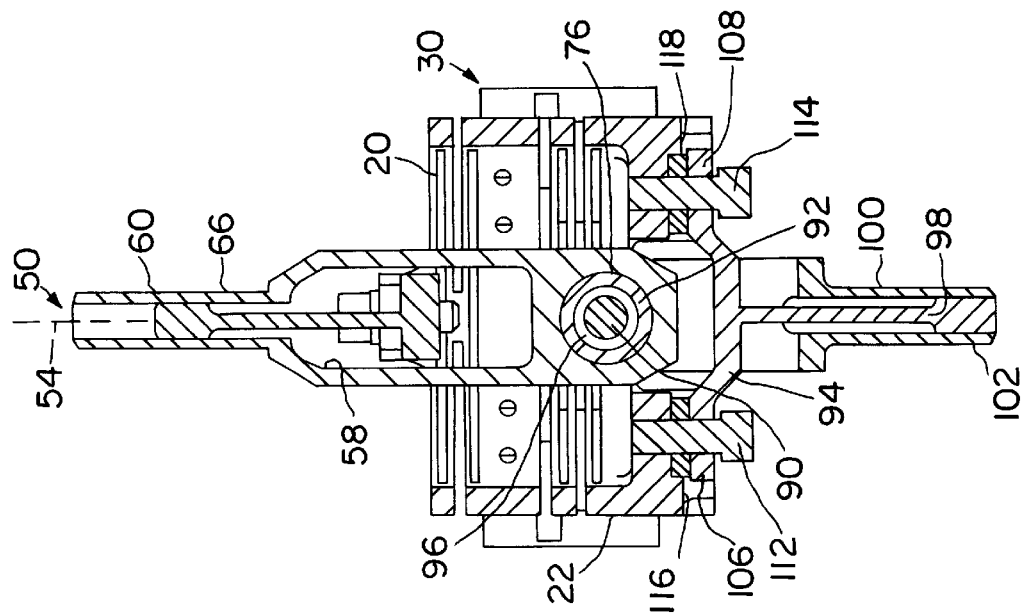
FIG. 4 is a cross-section of the spring assembly of FIG. 2 taken along 2—2.
Figure 3:
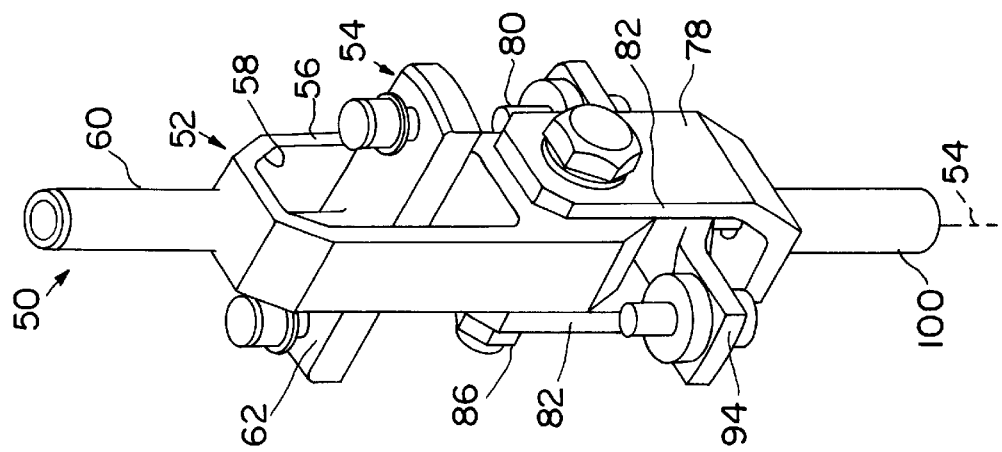
FIG. 3 is a perspective of the launch load diverter removed from the spring assembly of FIG. 2.

The spring assemblies 12 are adapted to isolate the vibrational forces experienced by the operating device during the launching of the satellite. Referring to FIGS. 3 and 4, there is shown the load diverter identified by the general reference numeral 50. The load diverter 50 is integrated into the spring assembly 12 interconnecting a yoke 52 which extends along the activating axis 54 to the spring assembly 12. The activating axis 54 extends longitudinally through the center of the shell 18. It represents the path along which the vibrational forces are transmitted to the operating device 16. The yoke 52 is comprised of a frame 56 which surrounds an opening 58. Extending from the top of the yoke 52 is a tubular section 60 which opens through the frame 56 into the opening 58. Within the frame 56 extending transverse the opening 58 is an arm 62 which is adapted to axially reciprocate along the activating axis 54 being guided in its movement by a rod 66 which extends from the arm 62 and is received in the tubular section 60. The arm 62 extends diametrically across the top of the shell 18. Each end of the arm 62 is affixed to the rim of the first flexure 20 by means of fasteners 70 and 72, so that any vibrational movement of the flexures 20 will cause the arm to reciprocate with the tube 60.

At the lower end of the yoke, below the opening 58 there is a drilled hole 76 that extends parallel to the arm 62 and normal to the opening 58. Fitted to the lower end of the yoke 52 is a "Y" shaped member 78 having upward reaching arms 80 and 82 that coincide with and straddle the hole 76. Each arm 80 and 82 has openings 84 and 86, respectively, that align with the hole 76 for receiving a bolt 90 therethrough and which captures the member 78 at the lower end of the yoke 52 so it can swingably move about the bolt 90. The inside diameter of the hole 76 is larger than the outside diameter of the bolt 90 so that there is an annular space 96 permitting the yoke to move in an axial as well as lateral direction. The diverter 50 is restricted in the extent of its movement by the compression of the flexure elements 20 and 22. The flexures 20 respond to any compression due to the downward movement of the arm 62 and any excessively high resonant frequencies imparted to the movement of the diverter 50 that exceed the damping capability of the flexure 20 are damped by the damping unit 30. The enlarged hole 76 can accommodate a liner of resilient material 92 which cushions the movement of the bolt 90 as the yoke 52 moves axially along the activating axis 54. As the yoke 52 is urged downward against the flexure elements 20 and 22, it will meet with bolt 90 which in turn will engage the resilient material 92 which lines the inside of the hole 76. The downward movement of the yoke 52 is restricted by a second arm 94 that operates independently of the yoke 52 and the member 78.

The arm 94 extends between the lower end of the yoke 52 and passes between the arms 80 and 82 of the member 78. The arm 94 is provided with a rod 98 that is received in a tubular member 102. Each end of the arm 94, 106 and 108 is equipped with an opening through which is placed slidable bolts 112 and 114, respectively. Interposed between the bolts 112 and 114 and the ends of the openings 106 and 108 are limiting washers 116 and 118, respectively. The washers 116 and 118 restrict the downward displacement of the arm 94 in its movement relative to the tubular structure 102. As the flexure elements 20 and 22 and the yoke 52 experience the strong vibrational force being transmitted, each of the washers 116 and 118 will engage the respective openings 106 and 108 preventing overstressing the flexures and at the same time insulating the operating device 16 from the vibrational forces.

Returning to FIG. 4, there is shown the arrangement involving the lower end of yoke 52 and the bolt 90 lodged in the enlarged hole 76. As described earlier, the enlarged hole 76 is lined with a resilient material 92 which acts as a spring when engaged by the bolt 90. In the circumstance that the vibrational forces are quite large such that they would exceed the restriction capabilities of the arm 94 and its limiting washers, the system would fall back to the limiting action of the bolt 90. The annular space 96 between the outer diameter of the bolt 90 and the inside diameter of the resilient liner 92 represents the limits of the axial movement of the load diverter 50. The load diverter 50 is fabricated from titanium. The resilient liner 92 is a rubber-like material sold by New Age Industries under the trade name VITON.

It has been found that an operable range for the liner is 20–40 ml. thick, preferably 30–65 ml. It will be understood that other suitably resilient materials may be used for the liner 92. The operable size for the space 96 may be in the range of 0.030" to 0.05", the preferred space being 0.04". It will be understood that the size of the annular space 96 represents a limit for the insulator described in the particular environment. Accordingly, the annular space 96 may be smaller where a significant vibrational force would be encountered or may be greater if lesser forces are expected. In the situation where the satellite is being launched, the extensive load will be transmitted from the flexure 20 through the arm 62 and through the frame 56 and then picked up by the damping units 30 and the lower flexure 22. In the circumstance, the force will exceed the predetermined annular space 96 required to protect the operating device, the bolt 90 will strike the resilient liner 92 and prevent the transmission of the forces to the operating device.

Figure 5:
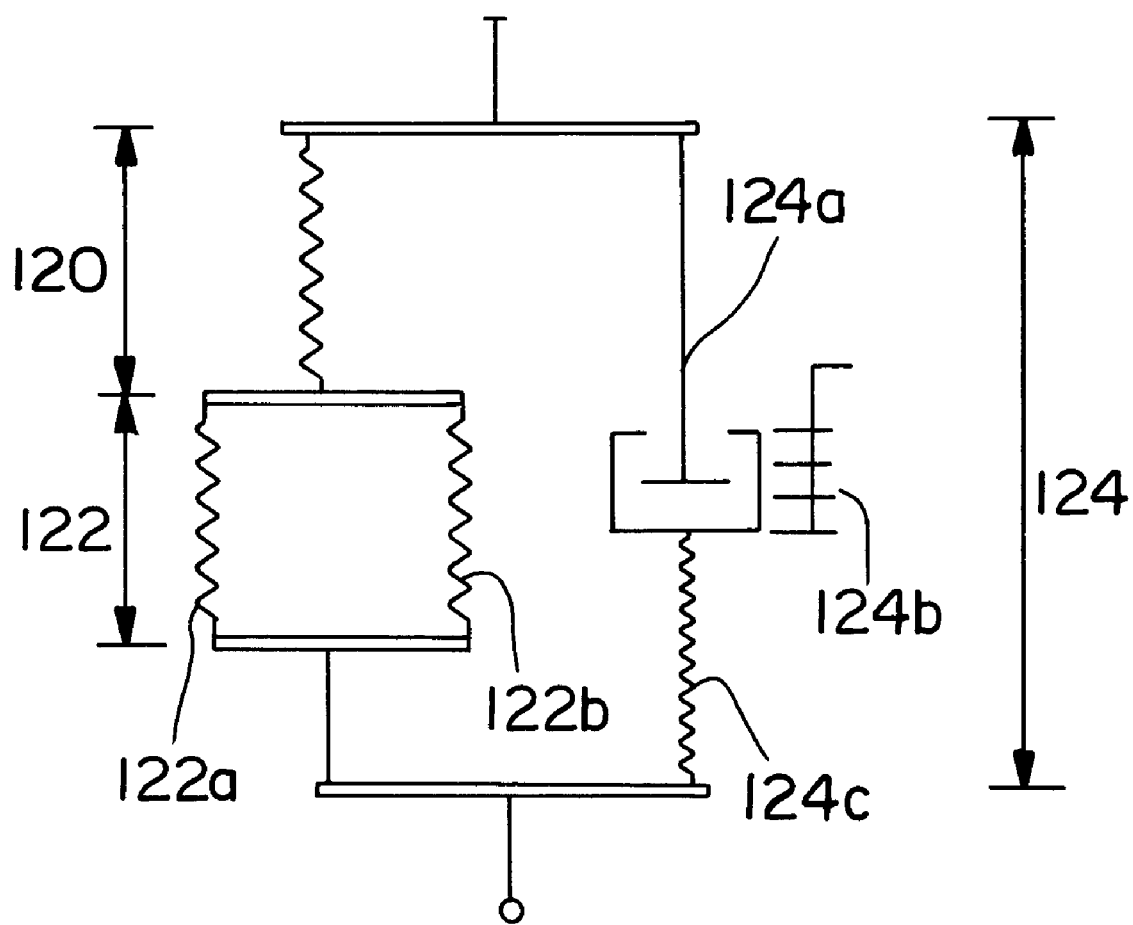
FIG. 5 is a schematic of each spring assembly showing the series-parallel relation of the flexures and the damping unit and the launch load diverter.

FIG. 5 is a schematic representation of the spring assemblies 12 by showing how the isolator 10 inter-reacts when subjected to the five directional vibrational forces to effectively isolate the operating device 16. The first spring element represented by the jagged line 120 is in series with the second spring element 122. Spring element 122 is comprised of the flexures 122a and the damping unit 122b. The flexures 122a and the damping unit 122b are in parallel relationship; that is, they each respond to the energies absorbed by the other. The load diverter 124 is schematically represented by the plunger-like structure 124a, which juxtaposes the step gradations 124b, both residing atop the jagged line 124c. As the frequencies exceed the analytically determined 9 Hz threshold, the elements 120 and 122 will absorb the axial vibrations thereby attenuating the frequency effect on the operating device 16. The series arrangement will result in both spring elements 120 and 122a absorbing the disturbances. At higher disturbance frequencies spring 122b stiffens relative to 122, thus element 120 becomes more active. This makes the transmissibility lower at higher frequencies, thus improving the isolator performance. The load diverter 124 will respond to any axial forces during launch which will be absorbed in the jagged line 124c.

During the launch the operating device which is free to move and respond to the launch forces, will experience severe vibrational forces in excess of what could be handled by just the series arrangement of the spring elements 120 and 122. In that circumstance, the load diverter 50 acting along its axis 54 (FIG. 3) will be restricted in its reciprocal movement by the annular space 96 (FIG. 4), thereby overriding the spring elements 120 and 122 and thereby effectively insulating the operating device during the initial minutes of the launch.

In practice the isolator construction is designed to attenuate the transmissibility of the multi-dimensional forces above a pre-determined level. This pre-determined level is determined analytically for a particular application. In this application the attenuation of the vibrational forces is intended to occur when the operating device is exposed to frequencies of at least 9 Hz. This was determined experimentally to provide the necessary isolation of the operating device that would satisfy its performance requirements. For example, in the instant application the exploratory x-ray telescope is required to track commands to 0.1 arc seconds (0.5 $\mu$rad) over a range of 200 arc seconds (0.06°).

The six machined spring assemblies as described hereinabove are affixed between the support platform 14 and the operating device 16 in three paired sets by means of top and bottom anchors 28 and 29 for each assembly. The spring assemblies 12 have an activating axis 54 which defines the path through the spring assembly 12 and between the support platform 14 and the operating device 16. It is along the activating axis 54 that the multi-dimensional vibrational forces are transmitted. The activating axis 54 extending between the anchors 28 and 29 intersects the plane which contains the center of mass of the isolator and the source of the vibration-generating disturbance. It will be understood that the activating axis 54 need not meet at the center of mass but intersect the plane that contains the center of mass. The plane itself is defined by the points of intersection of the extension of the activating axis 54 of each pair of spring assemblies 12. Referring to FIG. 1, if the activating axis 54 of each pair of spring assemblies 12 is extended in the direction of the support there will be formed three points of intersection of each of the pairs. The three points of intersection define the plane which contains the center of mass.

In order to assure identical radial and axial isolator overall stiffness, the angle between the spring assemblies 12 (shown in FIG. 1) should be set so that the three translational forces and the two moment forces are equalized. The angle is formed between the plane and the extension of the activating axis for each spring assembly so that there results a convergence of the isolation frequencies. In the instant application this angle may be in the range of 30° to 40°, the preferred range being 34° to 36°, and in particular, 35.26°.

The performance of the insulator of the instant invention may be measured by plotting generated frequency against the transmissibility. Acceptable performance will tend to show a negative slope for increasing frequencies. In the instant application, an increase of an octave in the frequency will result in a −12 dB slope. In other words, as the frequency increases, the transmissibility decreases demonstrating that the isolator is meeting the transmissibility requirements where the isolator performance must not exceed the analytical transmissibility curves.

Although the invention has been described with particular reference to certain preferred embodiments thereof, variations and modifications can be effected within the spirit and scope of the following claims.

What is claimed is:

1. An apparatus for isolating an operating device against disturbances caused by directional vibration forces generated in an axial and lateral direction, said apparatus comprising:
    a series of spring assemblies disposed between the vibration generating forces and the operating device, said spring assemblies further comprising first and second spring elements;
    load diverter means for transmitting the vibration forces to the spring assemblies; and
    activating axis means for positioning said spring assemblies relative to said directional vibration forces;
    whereby said first and second spring elements being adapted to absorb the directed vibration forces and the second spring element adapted to dampen vibrational forces.

2. The apparatus as claimed in claim 1 wherein the second spring element comprises a resilient flexure member and flexure restraint means comprising a shear resistant viscoelastic pad spanning said flexure member whereby the viscoelastic pad dampens the flexure of the second spring means.

3. The apparatus as claimed in claim 1 wherein the first and second spring elements are in series.

4. The apparatus as claimed in claim 2 wherein the viscoelastic pad is viscoelastic rubber.

5. The apparatus as claimed in claim 1 wherein the first and second spring elements comprise coaxial flexure rings that are responsive to axial tension and compression forces.

6. An apparatus for isolating an operating device against disturbances caused by vibrational forces generated by equipment having a center of mass, said apparatus comprising:
    a series of spring assemblies placed in a predetermined configuration between the equipment generating the vibrational forces and the operating device, said spring assemblies comprising first and second spring elements;
    a platform for supporting said vibration generating equipment;
    a load diverter integral with said spring assemblies; and
    activating axis means extending longitudinally through said spring assemblies and said load diverter defining a path along which the vibrational forces are transmitted to the operating device;
    whereby said spring assemblies and the load diverter intercept the vibrational forces isolating the operating device.

7. The apparatus as claimed in claim 6 wherein the flexure means of the second spring means is in parallel with the viscoelastic pad.

8. The apparatus as claimed in claim 6 wherein the spring assemblies are combined in 3 paired sets and affixed to a support means, said support means being attached to the source of the vibration generating disturbances and the angle between the spring assemblies and said activating axis is in the range of 30° to 40°.

9. The apparatus as claimed in claim 6 wherein said equipment has a center of mass lying in a predetermined plane and the support platform attaches the spring assemblies so that the direction of the activating axes intersects the predetermined plane that contains the center of mass.

10. The apparatus as claimed in claim 6 wherein the spring assemblies are coupled in response to the vibrational forces.

11. The apparatus as claimed in claim 6 wherein the response of each of the spring assemblies to the vibrational forces is independent of the response of other spring assemblies.

12. An apparatus for isolating an operating device against multidirectional disturbances caused by vibrational and load forces, said apparatus comprising:
    a support platform for supporting equipment that generates vibrational forces;
    a series of spring assemblies comprising first and second spring elements, said spring elements including resilient flexures, said first and second spring elements being in series with one another;
    load diverter means integral with said spring assemblies and adapted to respond to the load forces and restraint of sudden loads applied to the operating device;
    an activating axis extending longitudinally through said spring assemblies and load diverter for directing the multidirectional disturbances to the isolating apparatus;
    means for attaching said series of spring assemblies and load diverter means between the operating device and the support platform;
    whereby the multidirectional generated forces are absorbed in the spring elements and the axial loads diverted by said load diverter means thereby isolating the operating device from the multidirectional vibrational and load forces.

13. The apparatus as claimed in claim 12 wherein the load diverter comprises a yoke adapted to move axially along said activating axis and including an upper yoke portion for engaging the first spring means and lower yoke portion equipped with a stop means for restraining the reciprocal movement of the upper and lower yoke portions to a predetermined position thereby diverting the axial load force from acting on the first and second spring elements.

14. The apparatus as claimed in claim 13 further comprising a rotatable shaft at the lower yoke portion, said shaft being concentrically mounted in spaced apart relationship within a bumper element providing a predetermined gap therebetween wherein said predetermined gap defines the limiting stop for the load diverting means.

15. The apparatus as claimed in claim 14 wherein the gap between the rotatable shaft and the bumper element is in the range of 0.020 inches to 0.060 inches.

16. The apparatus as claimed in claim 13 wherein the bumper element is fabricated of a rubber material.

17. The apparatus as claimed in claim 12 wherein the spring assemblies are combined in pairs and said pairs are affixed to support means, said support means attached to the source of the vibration generating disturbances and the spring assemblies attached to the operating device.

18. An apparatus for isolating an operating device against multiple disturbances including vibrational forces generated in an axial direction and in a lateral direction relative to said operating device, said apparatus comprising:

a bracket for mounting said operating device;

a support platform for supporting equipment that generates the vibrational forces;

activating axis means for transmitting the multiple disturbances along a predetermined path;

a series of paired spring assemblies, comprising first and second spring elements, said first and second spring elements comprising flexure elements disposed in a series relation to one another and normal to said activating axis, said second spring elements including damping means for damping the axially and laterally directed disturbances, said spring assemblies further being mounted in a predetermined position relative to said activating axis between said support platform and mounting bracket;

a diverter integrated with said spring assemblies and disposed along said activating axis for diverting the axial loads applied to said operating device, said diverter comprising a resilient stop limiting the axial movement of the diverter, thereby isolating said operating device.

* * * * *